United States Patent
Kim et al.

(10) Patent No.: US 10,532,423 B2
(45) Date of Patent: Jan. 14, 2020

(54) BATTERY PACK AND METHOD FOR MANUFACTURING THE SAME

(71) Applicant: LG CHEM, LTD., Seoul (KR)

(72) Inventors: Yong Kim, Daejeon (KR); Yong Su Choi, Daejeon (KR); Sang Hun Kim, Daejeon (KR); Sang Suk Jung, Daejeon (KR); Won Pill Hwang, Daejeon (KR); Cho Long Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/340,654

(22) Filed: Nov. 1, 2016

(65) Prior Publication Data
US 2017/0170445 A1    Jun. 15, 2017

(30) Foreign Application Priority Data

Dec. 9, 2015 (KR) .......................... 10-2015-0175281
Aug. 9, 2016 (KR) .......................... 10-2016-0101078

(51) Int. Cl.
| | |
|---|---|
| *B23K 20/10* | (2006.01) |
| *H01M 2/30* | (2006.01) |
| *H01M 2/20* | (2006.01) |
| *B23K 26/32* | (2014.01) |
| *B23K 26/244* | (2014.01) |
| *H01M 2/10* | (2006.01) |

(Continued)

(52) U.S. Cl.
CPC ............ *B23K 20/10* (2013.01); *B23K 26/244* (2015.10); *B23K 26/32* (2013.01); *H01M 2/1061* (2013.01); *H01M 2/204* (2013.01); *H01M 2/30* (2013.01); *B23K 2101/36* (2018.08); *B23K 2101/38* (2018.08)

(58) Field of Classification Search
None
See application file for complete search history.

(56) References Cited

U.S. PATENT DOCUMENTS 9,640,792 B2   5/2017 Jung et al.
2002/0146620 A1* 10/2002 Connell .............. H01M 2/0277
                                                    429/161

(Continued)

FOREIGN PATENT DOCUMENTS

| JP | 2003/217557 | * | 7/2003 | .............. H01M 2/22 |
| JP | 2003-217557 A |   | 7/2003 | |
| KR | 10-0958649 B1 |   | 5/2010 | |

(Continued)

OTHER PUBLICATIONS

English translation of KR 2014/0044440 (Year: 2014).*
English translation of JP 2003/217557 (Year: 2003).*

*Primary Examiner* — Yoshitoshi Takeuchi
(74) *Attorney, Agent, or Firm* — Birch, Stewart, Kolasch & Birch, LLP

(57) ABSTRACT

Provided is a battery pack. The battery pack includes a plurality of battery cells, each of which is provided with an electrode tab, an electrode lead including first and second lead parts respectively connected to the electrode tabs of the adjacent battery cells and a connection part connecting the first and second lead parts to each other, and a bus bar to which the first and second lead parts are coupled and connecting the plurality of battery cells to each other in series or parallel.

4 Claims, 15 Drawing Sheets

(51) Int. Cl.
*B23K 101/36* (2006.01)
*B23K 101/38* (2006.01)

(56) References Cited

U.S. PATENT DOCUMENTS

2007/0134551 A1* 6/2007 Cyr .................. H01M 2/206
                                               429/160
2015/0072205 A1* 3/2015 Jung .................. H01M 2/1077
                                               429/94

FOREIGN PATENT DOCUMENTS

| KR | 10-2013-0139472 A | | 12/2013 | |
|----|-------------------|----|---------|-------------|
| KR | 2013/0139472 | * | 12/2013 | ............ H01M 10/04 |
| KR | 10-2014-0044440 A | | 4/2014 | |
| KR | 2014/0044440 | * | 4/2014 | ............. H01M 2/26 |
| KR | 10-2015-0124846 A | | 11/2015 | |

\* cited by examiner

BATTERY PACK AND METHOD FOR MANUFACTURING THE SAME

CROSS-REFERENCE TO RELATED APPLICATIONS

This application claims the benefit of the priority of Korean Patent Application Nos. 10-2015-175281, filed on Dec. 9, 2015, and 10-2016-0101078, filed on Aug. 9, 2016, in the Korean Intellectual Property Office, the disclosure of which are incorporated herein by reference.

BACKGROUND OF THE INVENTION

Field of the Invention

The present invention relates to a battery pack and a method for manufacturing the same, and more particularly, to a battery pack that is improved in weldability between an electrode lead and a bus bar, which are coupled to battery cells adjacent to each other, and a method for manufacturing the same.

Description of the Related Art

In general, secondary batteries refer to chargeable and dischargeable, unlike primary batteries that are not chargeable. The secondary batteries are being widely used in the high-tech electronic fields such as mobile phones, notebook computers, and camcorders.

Secondary batteries are being proposed to solve air pollution due to existing vehicles that use fossil fuels. That is, such a secondary battery for vehicles uses a battery pack in which a plurality of battery cells are connected to each other in series or parallel.

SUMMARY OF THE INVENTION

The battery pack according to the related art includes a plurality of battery cells, an electrode lead coupled to the battery cells, and a bus bar to which the electrode lead coupled to the adjacent battery cells is coupled and connecting the plurality of battery cells to each other in series or parallel.

In the battery pack according to the related art, the electrode leads respectively coupled to the adjacent battery cells are welded and coupled in a state in which the electrode leads overlap each other.

However, in the battery pack according to the related art, when the electrode leads respectively coupled to the adjacent battery cells are welded to the bus bar in the state in which the electrode leads overlap each other, welding energy may be uniformly transmitted to the overlapping electrode leads to cause welding defects.

An aspect of the present invention provides a battery pack in which weldability between an electrode lead coupled to adjacent battery cells and a bus bar is improved to prevent welding defects from occurring, and particularly, electrode leads coupled to adjacent battery cells are integrated to simplify a structure and improve connectivity, and a method for manufacturing the same.

According to an aspect of the present invention, there is provided a battery pack includes: a plurality of battery cells, each of which is provided with an electrode tab; an electrode lead including first and second lead parts respectivley connected to the electrode tabs of the adjacent battery cells and a connection part connecting the first and second lead parts to each other; and a bus bar to which the first and second lead parts are coupled and connecting the plurality of battery cells to each other in series or parallel.

The electrode lead of the electrode lead and the bus bar may be primarily coupled to each other, and the second lead part and the first lead part may be secondarily coupled to each other in a state in which the second lead part overlaps the first lead part.

The connection part, the first lead part, and the second lead part may be integrated with each other, and the second lead part may be folded with respect to the connection part to overlap a top surface of the first lead part.

A folding groove may be defined in one surface of the connection part, which is directed in a direction in which the second lead part is folded.

The first lead part and the bur bar or the second lead part and the first lead part may be coupled to each other through ultrasonic or laser welding.

The first lead part and the second lead part may overlap each other so that corresponding entire surfaces of the first and second lead parts are closely attached to each other.

According to another aspect of the present invention, there is provided a battery pack includes: a unit battery module in which a separator is disposed between a negative electrode plate and a positive electrode plate and including an electrode tab constituted by a negative electrode tab extending from the negative electrode plate and a positive electrode tab extending from the positive electrode plate; and a bus bar electrically connecting the electrode tabs between the unit battery modules that are adjacent to each other, wherein one of the two electrode tabs connected to each other includes first and second connection parts that respectively protrude from both sides in a longitudinal direction of an end thereof, the other electrode tab includes a third connection part protruding from one side in a longitudinal direction of an end thereof and connected to the first connection part, an end of one side of the bus bar, which faces the second connection part, protrudes to the electrode tab and is connected to the second connection part, the battery pack further includes an electrode lead including first and second lead parts respectively connected to the first and third connection parts and a connection part connecting the first and second lead parts to each other, and the first and second lead parts and the connection part are integrated with each other.

The second connection part and the bus bar may be primarily coupled to each other, and the first connection part and the third connection part may be secondarily coupled to each other in a state in which the second lead part overlaps the first lead part.

The second lead part may be folded with respect to the connection part to overlap a top surface of the first lead part.

A folding groove may be defined in one surface of the connection part, which is directed in a direction in which the second lead part is folded.

The second connection part and the bus bar or the first connection part and the third connection part may be coupled to each other through ultrasonic or laser welding.

The first lead part and the second lead part may be coupled to each other through ultrasonic or laser welding.

The first and second lead parts may overlap each other so that corresponding entire surfaces of the first and second lead parts are closely attached to each other.

According to another aspect of the present invention, there is provided a method for manufacturing a battery pack includes: an electrode lead manufacturing step (S10) of manufacturing an electrode lead on which first and second lead parts are respectively disposed on both sides thereof with respect to a connection part; a battery cell coupling step (S20) of coupling an electrode tab of an electrode assembly to each of front ends of the first and second lead parts and sealing an edge of a case in a state in which the electrode case is accommodated in the case to couple a battery cell to each of the front ends of the first and second lead parts; a primary electrode lead coupling step (S30) of coupling the first lead part to the bus bar in a state in which the first lead part is placed on the bus bar; an electrode lead folding step (S40) of folding the connection part to allow the second lead part to be closely attached to a top surface of the first lead part; a secondary electrode lead coupling and battery module manufacturing step (S50) of coupling the second lead part and the first lead part, which overlap each other, to manufacture battery modules; and a battery pack manufacturing step (S60) of vertically stacking the battery modules to manufacture the battery pack.

BRIEF DESCRIPTION OF THE DRAWINGS

The above and other aspects, features and other advantages of the present invention will be more clearly understood from the following detailed description taken in conjunction with the accompanying drawings, in which:

FIGS. 7 to 11 are views illustrating the method for manufacturing the battery pack according to an embodiment of the present invention, wherein FIG. 7 is a view illustrating a state in which the electrode lead is manufactured, FIG. 8 is a view illustrating a state in which the electrode lead is coupled to a battery cell, FIG. 9 is a view illustrating a state in which the electrode lead and a bus bar are primarily welded to each other, FIG. 10 is a view illustrating a state in which the electrode lead is folded in half, and FIG. 11 is a view illustrating a state in which both ends of the overlapping electrode lead are secondarily welded to each other.

DETAILED DESCRIPTION OF THE PREFERRED EMBODIMENT

Figure 1:
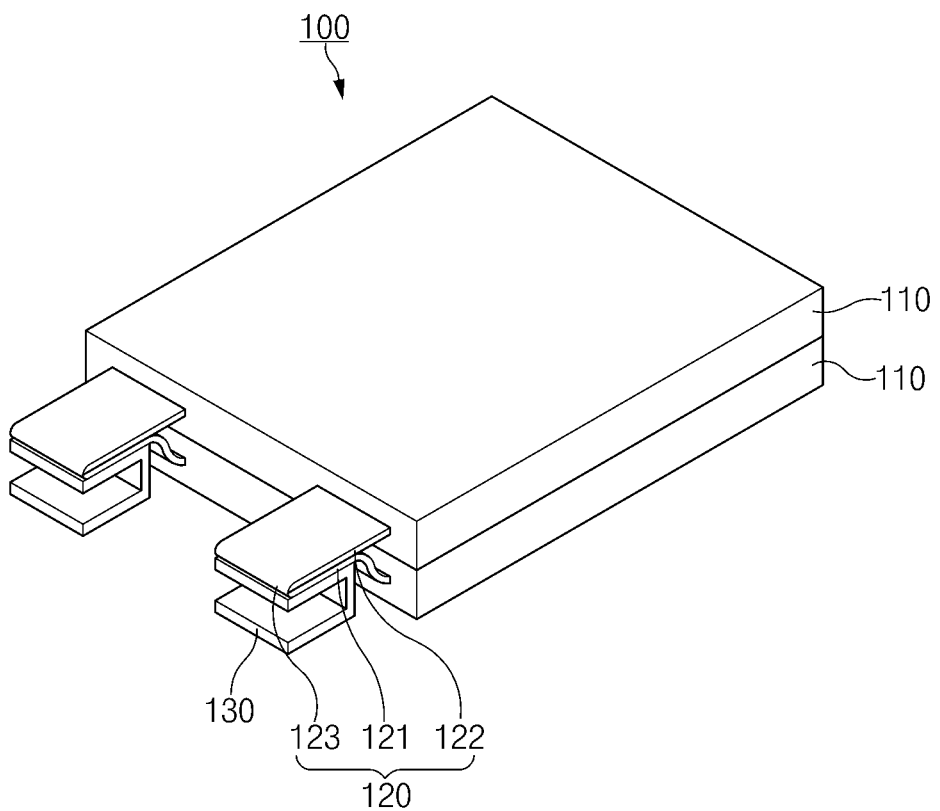
FIG. 1 is a perspective view of a battery back according to an embodiment of the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present invention will be omitted for clarity, and also like reference numerals in the drawings denote like elements.

An Embodiment of the Present Invention

As illustrated in FIG. 1, a battery pack 100 according to an embodiment of the present invention includes a plurality of battery cells 110 provided with electrode tabs, an electrode lead 120 coupled to each of the electrode tabs of the adjacent battery cells 110 to connect the adjacent battery cells 110 to each other, and a bus bar 130 to which the electrode lead 120 is coupled and connecting the plurality of battery cells 110 to each other in series or parallel.

Each of the battery cells 110 includes an electrode assembly and a case assembly in which the electrode assembly is accommodated. The electrode assembly has a structure in which a plurality of electrodes and a plurality of separators are alternately stacked on each other. Here, the plurality of electrodes include a first electrode and a second electrode. Also, the electrode tabs are coupled to the first electrode and the second electrode, respectively.

Figure 2:
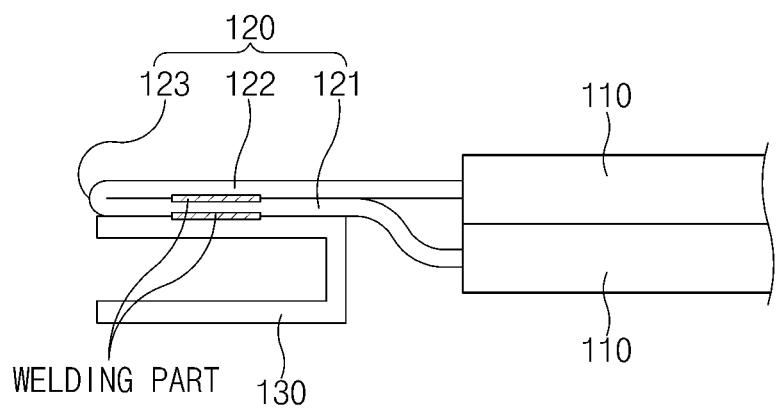
FIG. 2 is a side view of the battery pack according to an embodiment of the present invention.

As illustrated in FIGS. 1 and 2, the electrode lead 120 is used for connecting the electrode tabs having the same polarity, which are provided on the adjacent battery cells 110. The electrode lead 120 includes first and second lead parts 121 and 122 respectivley coupled to the electrode tabs (not shown) of the adjacent battery cells 110 and a connection part 123 connecting the first and second lead parts 121 and 122 to each other.

Figure 3:
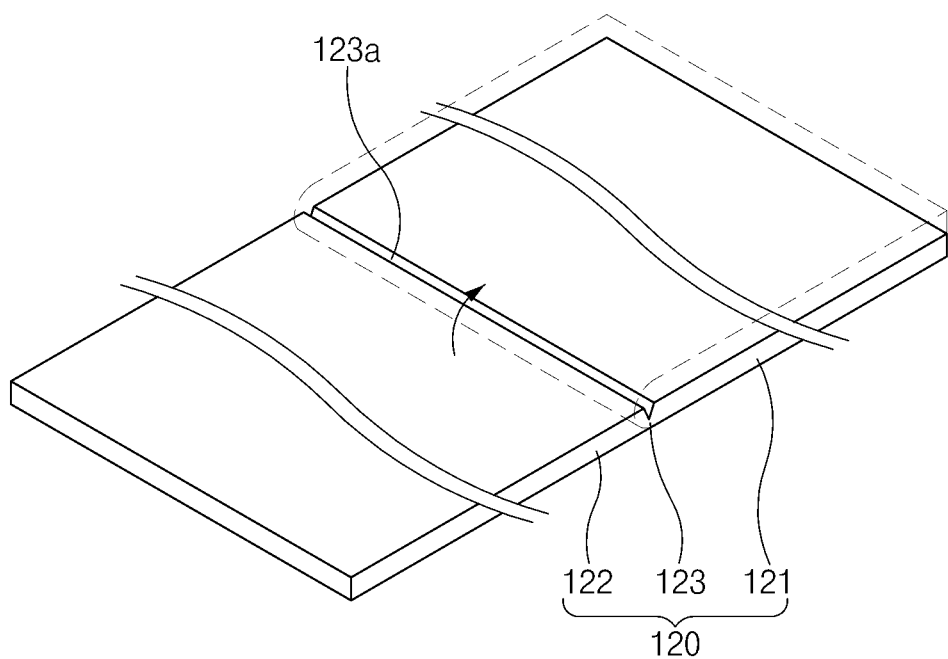
FIG. 3 is a perspective view illustrating an electrode lead of the battery pack according to an embodiment of the present invention.
Figure 4:
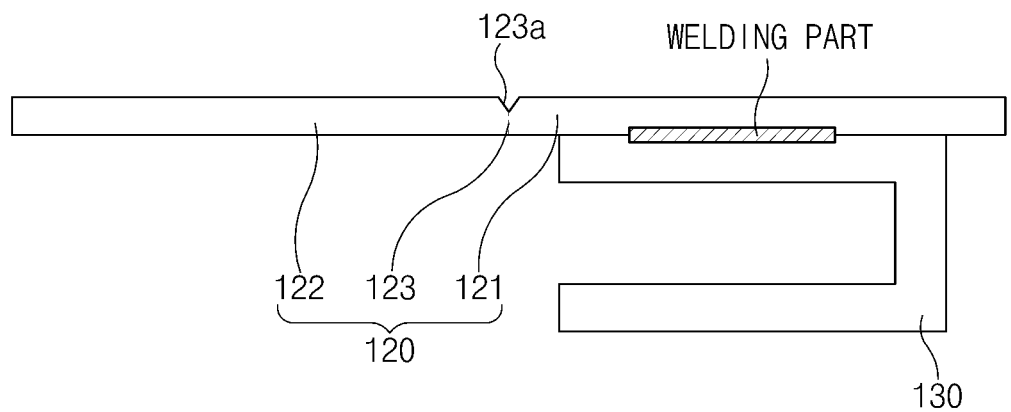
FIG. 4 is a view of a primarily welded state in the electrode lead of the battery pack according to an embodiment of the present invention.

That is, as illustrated in FIGS. 3 and 4, the electrode lead 120 has a '-'-shaped plate shape, and both ends of the electrode lead 120 are folded in a 'U' shape to overlap each other.

In more detail, referring to FIG. 3, in the electrode 120, the first and second lead parts 121 and 122 correspond to both ends, respectively. Also, the connection part 123 connecting the first lead part 121 to the second lead part 122 is disposed between the first and second lead parts 121 and 122. As a result, the electrode lead 120 has a '-' shape.

Here, the connection part 123, the first lead part 121, and the second lead part 122 may be integrated with each other to improve connectivity.

The electrode lead 120 having the '-' shape as described above is folded with respect to the connection part 123 so that the second lead part 122 overlaps a top surface of the first lead part 121. As a result, the electrode lead 120 may have the 'U' shape in which the first and second lead parts 121 and 122 overlap each other.

Thus, the electrode lead 120 that is folded in the 'U' shape may be coupled to the adjacent battery cells 110 at front ends of the first and second lead parts 121 and 122 to improve the connectivity between the adjacent battery cells 110.

The bus bar 130 is coupled to the electrode lead 120 coupled to the adjacent battery cells 110 to connect the plurality of battery cells to each other in series or parallel.

Here, the bus bar 130 may improve weldability by the electrode lead 120 that is folded in the 'U' shape so that both ends thereof overlap each other.

Figure 5:
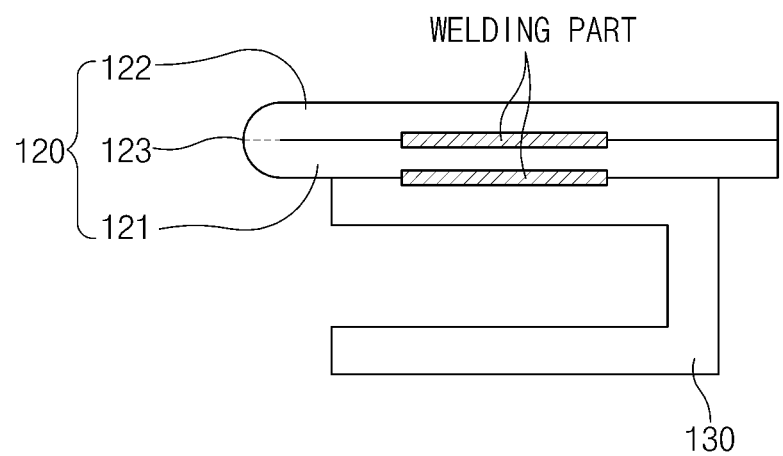
FIG. 5 is a view of a secondarily welded state in the electrode lead of the battery pack according to an embodiment of the present invention.

That is, as illustrated in FIG. 4, in the electrode lead 120, the first lead part 121 and the bus bar 130 are primarily welded and coupled to each other. Then, as illustrated in FIG. 5, the lead part 210 and the second lead part 220 are secondarily welded and coupled to each other in a state in which the first and second lead parts 121 and 122 are folded with respect to the connection part 123 to overlap each other.

As described, each of the overlapping portions between the second lead part 122 and the first lead part 121 and between the first least part 121 and the bus bar 130 may be welded to improve the weldability and thus prevent the welding defects from occurring.

A folding groove 123a is defined in one surface of the connection part 123, which is directed in a direction in which the second lead part 121 is folded, in a width direction of the electrode lead 120. Thus, folding force of the second lead part 121 may increase through the folding groove 123a.

The first lead part 121 and the bus bar 130 or the second lead part 122 and the first lead part 121 may be coupled through ultrasonic welding or laser welding to improve the weldability.

The first and second lead parts 121 and 122 overlap each other so that corresponding entire surfaces of the first and second lead parts 121 and 122 are closely attached to each other. Thus, since the closely attached surfaces of the first and second lead parts 121 and 122 increase in area, a plurality of portions to be welded may be provided to improve the weldability.

In the battery pack 100 including the above-described constituents according to the present invention, the connectivity between the adjacent battery cells 110 and the weldability between the electrode lead and the bus bar 130 may be improved through the electrode lead 200 that is folded in half.

Hereinafter, a method for the battery pack according to an embodiment of the present invention will be described.

Figure 6:
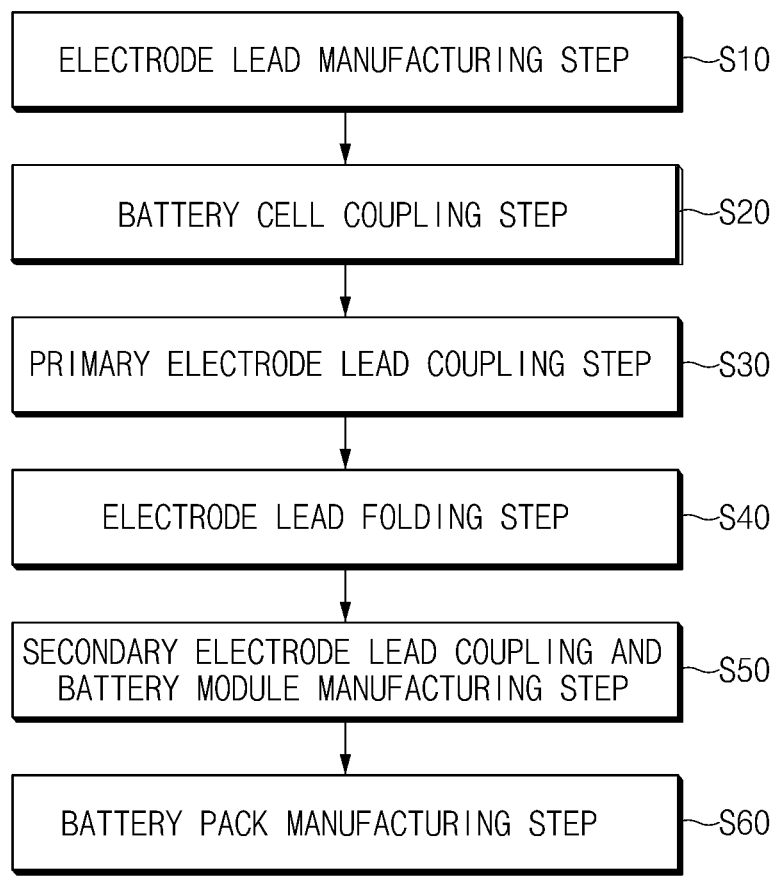
FIG. 6 is a flowchart illustrating a method for manufacturing the battery pack according to an embodiment of the present invention.

As illustrated in FIG. 6, the method for manufacturing the battery pack according to an embodiment of the present invention includes an electrode lead manufacturing step (S10), a battery cell coupling step (S20), a primary electrode lead coupling step (S30), an electrode lead folding step (S40), a secondary electrode lead coupling and battery module manufacturing step (S50), and a battery pack manufacturing step (S60).

Figure 7:
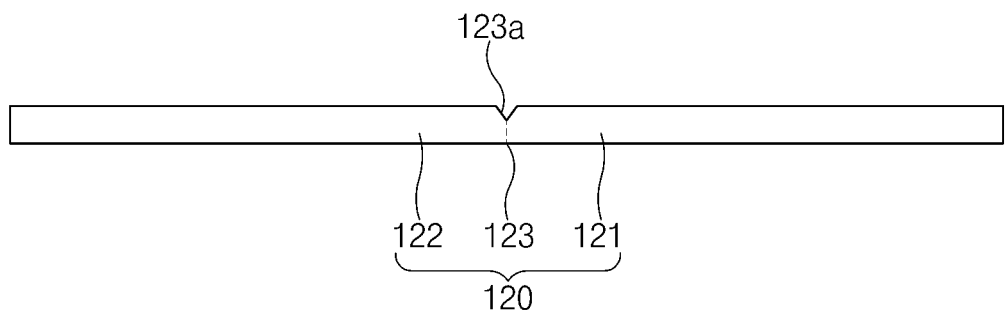

As illustrated in FIG. 7, in the electrode lead manufacturing step (S10), a connection part 123 having a folding groove 123a in a center thereof and a lead electrode 120 having a '-' shape and provided with first and second lead parts 121 and 122, which are respectively formed on both sides of the connection part 123, are manufactured.

Figure 8:
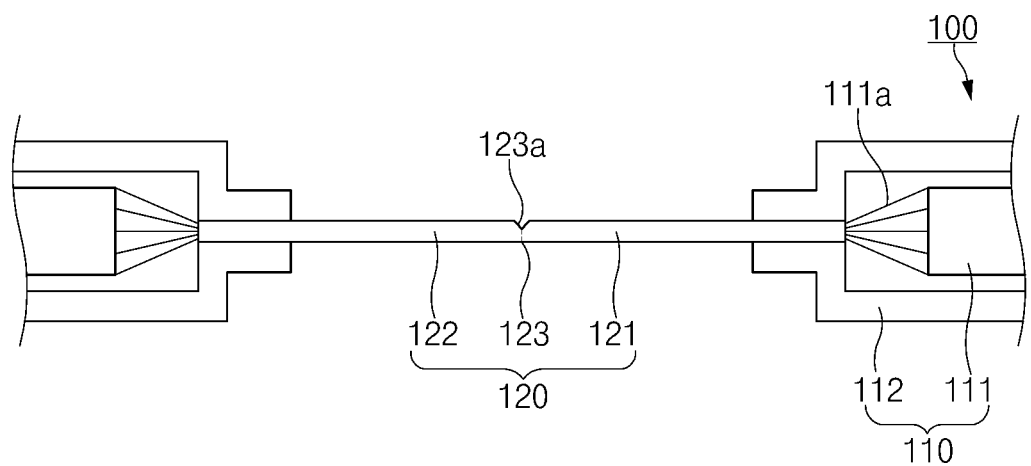

As illustrated in FIG. 8, in the battery cell coupling step (S20), a battery cell 110 is coupled to a front end of each of the first and second lead parts 121 and 122 of the electrode lead 120. The battery cell 110 may be coupled before or after the electrode lead 120 is coupled to a bus bar 130. The example in which the battery cell 110 is coupled before the electrode lead 120 is coupled to the bus bar will be described in the present invention.

That is, an electrode tab 111a disposed on an electrode assembly 111 is coupled to the front end of each of the first and second lead parts 121 and 122. Then, in a state in which the electrode assembly 111 is accommodated in a battery case 112, an edge of the battery case 112 is sealed to manufacture the battery cell 110. Thus, referring to FIG. 8, the battery cell 110 is coupled to each of both ends of the electrode lead 120.

Figure 9:
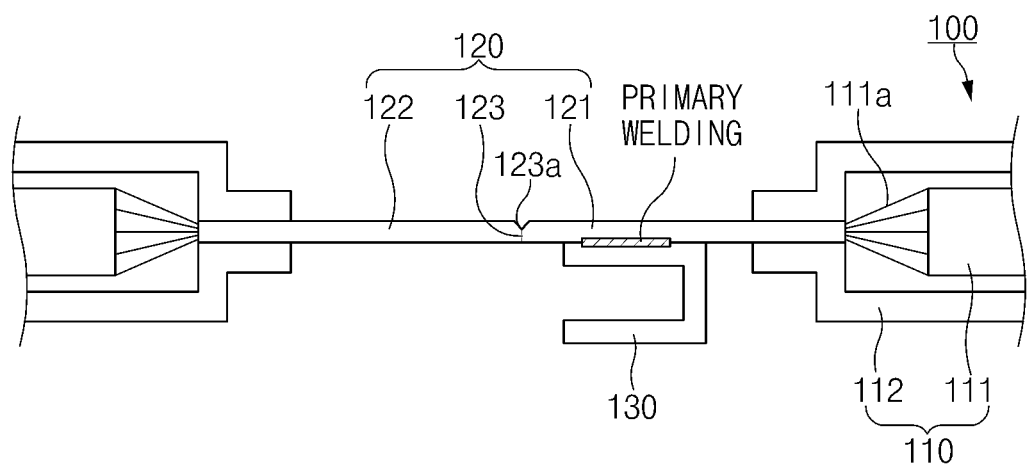

As illustrated in FIG. 9, in the electrode lead coupling step (S30), in a state in which a bottom of the first lead part 121 of the electrode lead 120 to which the battery cell 110 is coupled is disposed on a top surface of the bus bar 130, the first lead part 121 and the bus bar 130 are welded and primarily coupled to each other. That is, the first lead part 121 and the bus bar 130 are press-fitted at the same time and welded to each other. Thus, a welded state may be confirmed after the welding is performed to improve weldability and prevent welding defects from occurring.

Figure 10:
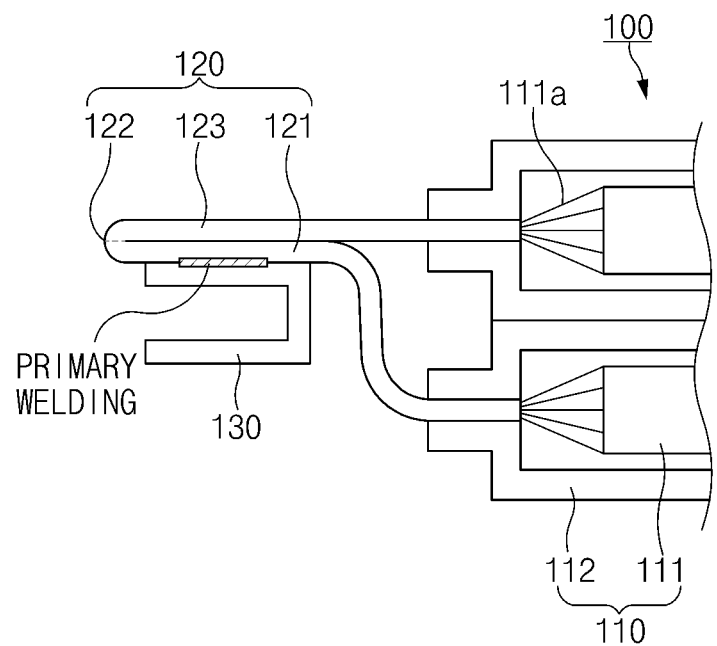

As illustrated in FIG. 10, in the electrode lead folding step (S40), the second lead part 122 is folded to overlap a top surface of the first lead part 121. Since the second lead part 122 is folded through a folding groove 123a formed in the connection part 123, the first and second lead parts 121 and 122 may be folded symmetrical to each other. That is, the electrode lead 120 is folded in half.

Figure 11:
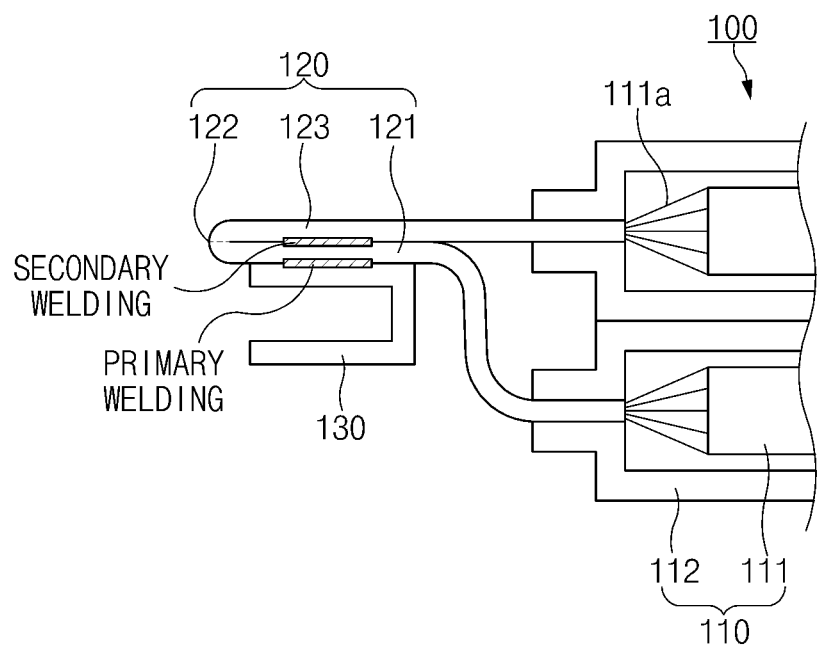

As illustrated in FIG. 11, in the secondary electrode lead coupling and battery module manufacturing step (S50), the first and second lead parts 121 and 122, which are closely attached to each other, are welded and secondarily coupled to each other. Thus, the battery module to which two battery cells 110 are coupled by the electrode lead 120 is manufactured.

In the battery pack manufacturing step (S60), the plurality of battery modules manufactured by the secondary electrode lead coupling and battery module manufacturing step (S50) are vertically stacked to manufacture the battery pack 100.

Hereinafter, in descriptions of another embodiment of the present invention, constituents having the same configuration and function as those according to the foregoing embodiment have been given with the same or similar reference numeral in the drawings, and thus their duplicated descriptions will be omitted.

Another Embodiment of the Present Invention

Figure 12:
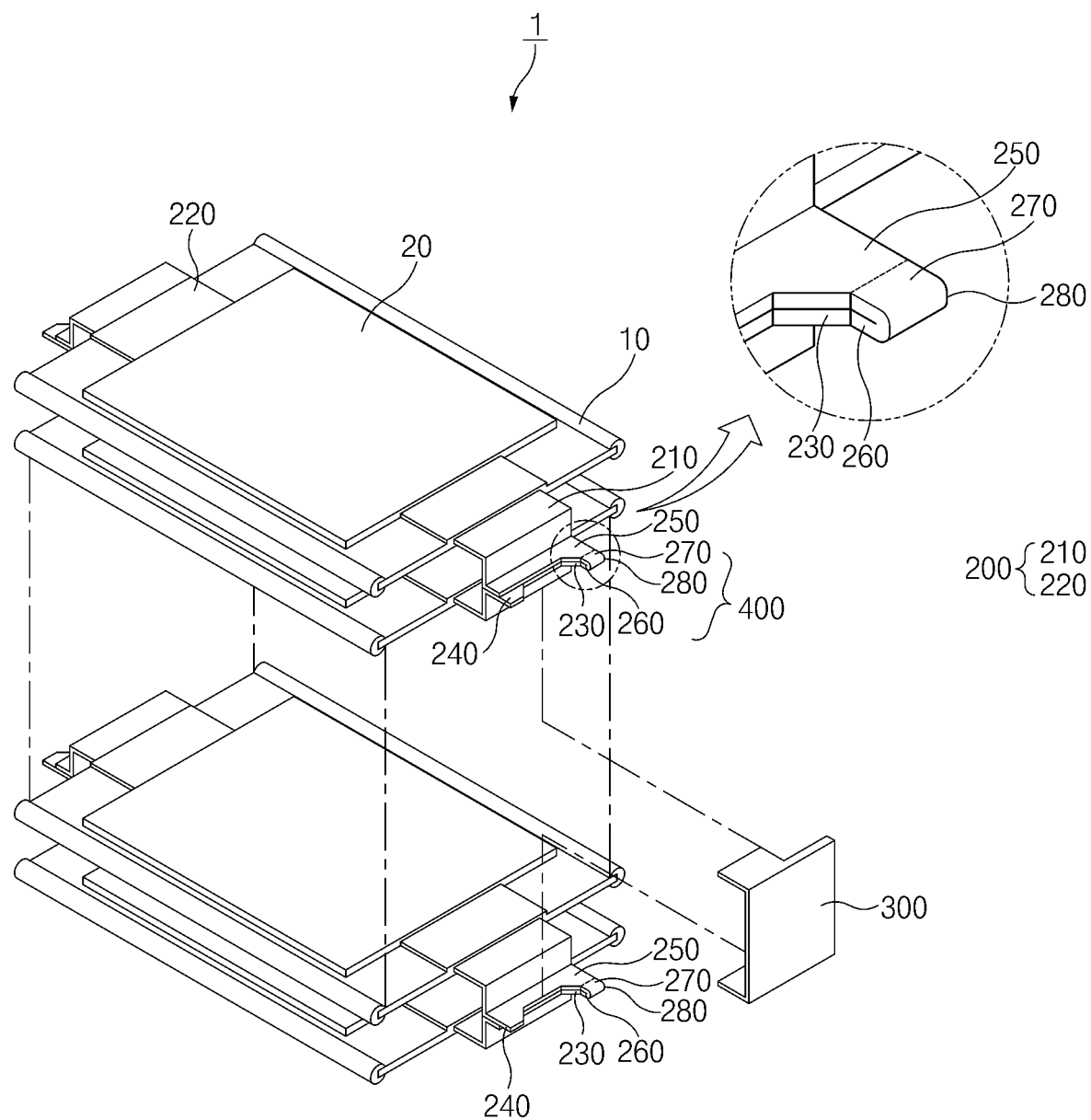
FIG. 12 is an exploded perspective view of a battery pack according to another embodiment of the present invention.
Figure 13:
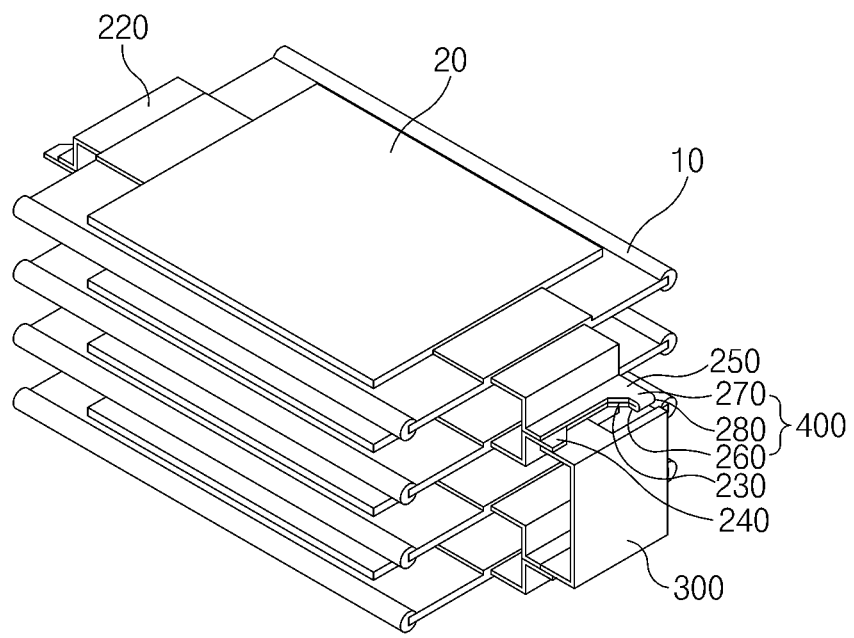
FIG. 13 is a perspective view of the assembled battery pack according to another embodiment of the present invention.

As illustrated in FIGS. 12 and 13, a battery pack 1 according to another embodiment of the present invention includes a plurality of unit battery modules 10 and a bus bar 300 electrically connecting the plurality of unit battery modules 10 to each other in series or parallel.

Each of the unit battery modules 10 includes an electrode plate 20 provided with a negative electrode plate and a positive electrode plate, a separator disposed between the negative electrode plate and the positive electrode plate, and an electrode tab 200 provided with a negative electrode tab 210 extending from the negative electrode plate and a positive electrode tab 220 extending from the positive electrode plate.

Here, an electrode assembly provided in the unit battery module 10 may have a jelly-roll shape that is formed by winding the negative electrode plate, the separator, and the positive electrode plate after the separator is disposed between the negative electrode plate and the position electrode plate. Alternatively, the electrode assembly may be a stack-type electrode assembly in which the negative electrode plate and the positive electrode plate, each of which is cut to a predetermined size, with the separator therebetween are stacked several times.

A negative electrode tab 210 and a positive electrode tab 220 of the unit battery module 10 may protrude in both directions of the electrode plate 20, respectively. That is, the negative electrode tab 210 may protrude to one side of the electrode plate 20, and the positive electrode tab 220 may protrude to the other side of the electrode plate 20.

When a plurality of unit battery modules 10 are stacked, the bus bar 300 electrically connects the electrode tabs 200 to each other between the adjacent unit battery modules 10. That is, as illustrated in FIG. 12, the bus bar 300 may electrically connect the negative electrode tabs 210, which are vertically disposed on right sides of the electrode plates 20, to each other and electrically connect the positive electrode tabs 220, which are vertically disposed on left sides of the electrode plates 20. Thus, the bus bar 300 may be bent in a '⊏'-shaped cross-sectional shape. If the bus bar 300 has a shape that is enough to connect the adjacent electrode tabs 200 to each other, the bus bar 300 may be freely deformed.

Here, the battery pack 1 according to another embodiment of the present invention has a coupling structure for improving the coupling property between the adjacent electrode tabs 200.

That is, the electrode tab 200 extends from the electrode plate 20 and is connected to face the electrode tab 200 of the adjacent electrode plate 20. Thus, a portion of the electrode tab 200 is bent to the adjacent electrode tab 200 due to a thickness of the electrode plate 20.

Also, a predetermined area of an end of the electrode tab 200 contacts and faces the adjacent electrode tab 200 in a state in which the electrode tab 200 is bent. Here, first and second connection parts 230 and 240, which respectively protrude from both sides in a longitudinal direction thereof, are disposed on an end of an upper portion of one electrode tab 200.

A third connection part 250, which protrudes from only one side in a longitudinal direction thereof and is connected to the first connection part 230, is disposed on an end of an upper portion of the other electrode tab 200.

Here, cutting or press processing may be performed on a predetermined area of the end of the electrode tab 200 to form the first, second, and third connection parts 230, 240, and 250.

Also, one side surface of the bus bar 300 is connected to two electrode tabs 200 that face and contact each other. Here, the bus bar 300 is connected to only the second connection part 200 that is not connected to the third connection part 250. Also, the other side surface of the bus bar 300, which is disposed at a lower side in FIG. 13, is connected to only the second connection part 240 that is not connected to the third connection part 250 when the two electrode tabs 200 are connected to each other.

Thus, according to another embodiment of the present invention, when the plurality of unit battery modules 10 are stacked to constitute the battery pack 1, the electrode tabs 200 having the same polarity of the electrode tabs of the adjacent unit battery modules 10 may be connected in parallel to each other by the bus bar 300.

Particularly, as described above, one side of the negative electrode tab 210 or the positive electrode tab 220 is connected to the first and third connection parts 230 and 250, which protrude from one side from the electrode tab 200, and the bus bar 300 is connected to only the second connection part 240 that protrudes from the other side of the electrode tab 200 to improve the connectivity. In the parallel connection, the short circuit may be completely blocked when either the negative electrode tab 210 or the positive electrode tab 220 is opened. Thus, it is no matter that a structure of the electrode tab 200 and the bus bar 300 are connected to only one of the two tabs.

Figure 14:
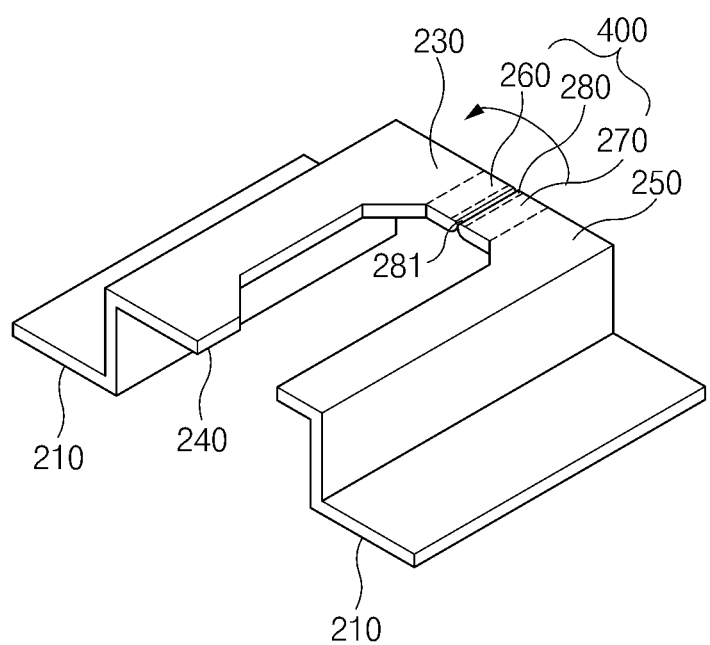
FIG. 14 is a perspective view illustrating an electrode lead of the battery pack according to another embodiment of the present invention.
Figure 15:
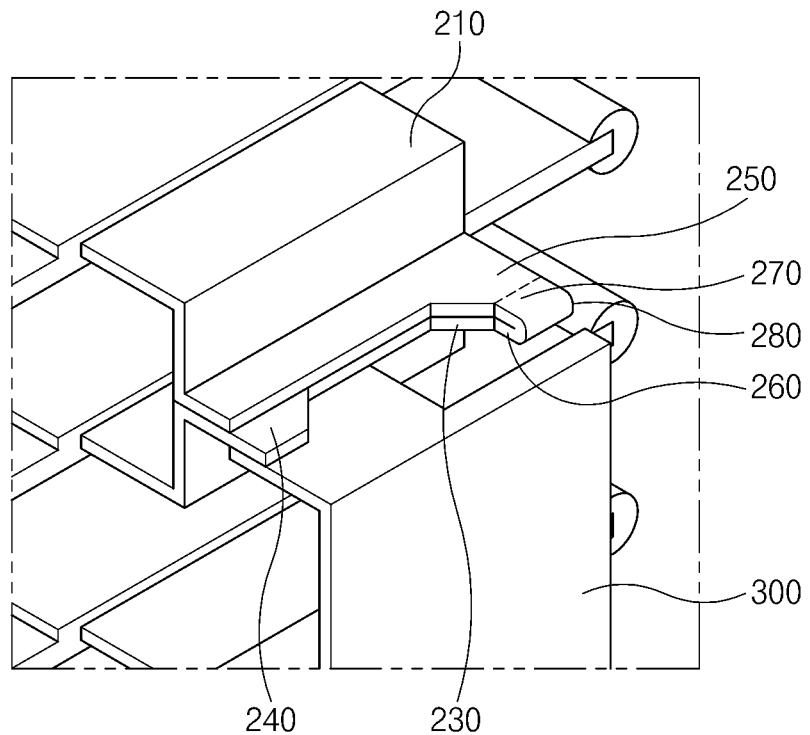
FIG. 15 is an enlarged view illustrating the electrode lead of the battery pack according to another embodiment of the present invention.

As illustrated in FIGS. 14 and 15, the battery pack 1 according to another embodiment of the present invention has a coupling structure for improving connectivity, manufacturability, and workability of the electrode tabs 200 that are adjacent to each other. That is, an electrode lead connecting the adjacent electrode tabs 200 to each other is provided.

That is, the electrode lead 400 is provided with first and second lead parts 260 and 270 respectively connected to the first and third connection parts 230 and 250 and a connection part 280 connecting the first and second lead parts 260 and 270 to each other. Here, the first and second lead parts 260 and 270 and the connection part 280 may be integrated with each other.

Thus, as illustrated in FIG. 14, in the electrode lead 400, the first and second lead parts 260 and 270 are bent with respect to the connection part 280 to overlap each other.

In related to the coupling, the second connection part 240 and the bus bar 300 are primarily coupled to each other, and the first and third connection parts 230 and 250 are secondarily coupled to each other in a state in which the second lead part 270 overlaps the first lead part 260.

Particularly, the second lead part 270 may be folded with respect to the connection part 280 to overlap a top surface of the first lead part 260, and thus, contact force may increase.

Also, a folding groove 281 may be defined in one surface of the connection part 280, which is directed in a direction in which the second lead part 270 is folded, and thus, the electrode lead 400 may be effectively bent through the folding groove 281.

Also, the second connection part 240 and the bus bar 300 or the first connection part 230 and the third connection part 250 may be coupled to each other through ultrasonic welding or laser welding, and thus, easiness of the work and coupling property may be improved.

Also, the first and second lead parts 260 and 270 may overlap each other so that corresponding entire surfaces of the first and second lead parts 260 and 270 are closely attached to each other, and coupling force may increase due to the increase of the contact area.

Also, the first and second lead parts 260 and 270, which overlap each other, may be coupled to each other through the ultrasonic welding or laser welding, and thus, the coupling property may be more improved.

Thus, in the battery pack 1 according to another embodiment of the present invention, the electrode tabs that are adjacent to each other may be connected through the electrode lead 40 to improve both of the connectivity and the coupling property.

First: in the battery pack according to the present invention, the connectivity between the adjacent battery cells may be improved by using the electrode lead that is foldable in the 'U' shape, and particularly, the structure of the battery pack may be significantly simplified.

Second: in the battery pack according to the present invention, the bus bar may be welded by using the electrode lead that is foldable in the 'U' shape to improve the weldability and thus prevent the welding defects from occurring.

Third: in the battery pack according to the present invention, since the foldable groove is formed in the center of the electrode lead, both ends of the electrode lead may be symmetrically folded.

Fourth: in the battery pack according to the present invention, since both ends of the electrode lead overlap each other so that the surfaces of both ends are closely attached to each other, the portion to be welded may increase in area or be provided in plurality to improve the weldability.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A battery pack comprising:
a plurality of battery cells, each of which is provided with an electrode tab and a battery case;
an electrode lead comprising first and second lead parts respectively connected to the electrode tabs of the adjacent battery cells and a connection part connecting the first and second lead parts to each other; and
a bus bar to which the first and second lead parts are coupled and connecting the plurality of battery cells to each other in series or parallel, the bus bar being external to the battery cases,
wherein the connection part, the first lead part, and the second lead part are formed integrally with each other,
wherein the bus bar is directly connected to only one surface of the first lead part,
wherein the second lead part is folded with respect to the connection part to contact a top surface of the first lead part so the electrode lead has a 'U' shape,
wherein the electrode lead is coupled to the adjacent battery cells at front ends of the first and second lead parts,
wherein a portion between the first least part and the bus bar is welded to configure a first welding part, and a portion between the second lead part and the first lead part is welded to configure a second welding part, and
wherein the first welding part and the second welding part are configured in a row to both face the first lead part respectively.

2. The battery pack of claim 1, wherein a folding groove is defined in one surface of the connection part such that the connection part is folded at the folding groove so that the second lead part is folded with respect to the connection part to contact the top surface of the first lead part.

3. The battery pack of claim 1, wherein the first lead part and the bus bar or the second lead part and the first lead part are coupled to each other through ultrasonic or laser welding.

4. The battery pack of claim 1, wherein the first lead part and the second lead part overlap each other so that corresponding entire surfaces of the first and second lead parts directly contact each other.

* * * * *